United States Patent
Freytag et al.

(10) Patent No.: US 12,426,525 B2
(45) Date of Patent: Sep. 30, 2025

(54) AGRICULTURAL MACHINE WITH ADDITIONAL AXLE

(71) Applicant: AGCO International GmbH, Neuhausen (CH)

(72) Inventors: Erich Freytag, Sachsenried (DE); Christoph Heinritz, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 999 days.

(21) Appl. No.: 17/449,185

(22) Filed: Sep. 28, 2021

(65) Prior Publication Data

US 2022/0159895 A1 May 26, 2022

(30) Foreign Application Priority Data

Nov. 20, 2020 (GB) .................................... 2018268

(51) Int. Cl.
| | | |
|---|---|---|
| A01B 63/02 | (2006.01) | |
| A01B 59/06 | (2006.01) | |
| A01B 63/00 | (2006.01) | |
| A01B 63/118 | (2006.01) | |

(52) U.S. Cl.
CPC .......... *A01B 59/068* (2013.01); *A01B 63/008* (2013.01); *A01B 63/118* (2013.01)

(58) Field of Classification Search
CPC ... A01B 59/043; A01B 59/048; A01B 59/068; A01B 63/008; A01B 63/118
See application file for complete search history.

(56) References Cited

U.S. PATENT DOCUMENTS

| | | | | |
|---|---|---|---|---|
| 2,782,703 A | * | 2/1957 | Chambers et al. | .. A01B 59/066 172/449 |
| 4,930,801 A | * | 6/1990 | Gillund | .................. B62D 49/04 172/449 |
| 5,746,275 A | * | 5/1998 | Cross | ................... A01B 59/068 280/503 |
| 6,189,901 B1 | * | 2/2001 | Smith | ...................... B60G 9/00 180/209 |

(Continued)

FOREIGN PATENT DOCUMENTS

| | | |
|---|---|---|
| DE | 102015115641 A1 | 3/2017 |
| EP | 2277766 A1 | 1/2011 |

(Continued)

OTHER PUBLICATIONS

UK Intellectual Property Office, Search Report for related UK Application No. GB2018268.9, dated May 19, 2021.

(Continued)

*Primary Examiner* — Gary S Hartmann

(57) ABSTRACT

An agricultural machine has a linkage system for hitching of an implement and an additional axle mounted to the linkage system. The linkage system includes at least one lift arm adjustably mounted to the chassis at an inner end and carrying a fastening device at an outer end. The additional axle is connected to at least one lift arm inboard of the fastening device. The linkage assembly may be a three-point linkage assembly having two lower lift arms, the additional axle being mounted between the lower lift arms.

13 Claims, 5 Drawing Sheets

(56) References Cited

U.S. PATENT DOCUMENTS

| | | | |
|---|---|---|---|
| 6,698,174 B2 * | 3/2004 | Martignon | A01B 59/048 56/15.8 |
| 7,931,285 B2 | 4/2011 | Pompa et al. | |
| 10,760,594 B2 | 9/2020 | Reitemann | |

FOREIGN PATENT DOCUMENTS

| | | | | |
|---|---|---|---|---|
| EP | 3162178 B1 | | 5/2017 | |
| FR | 2393704 A1 | | 1/1979 | |
| GB | 2222398 A | | 3/1990 | |
| GB | 2237173 A | * | 5/1991 | A01B 59/048 |
| NL | 1016001 C1 | | 2/2002 | |

OTHER PUBLICATIONS

European Patent Office, International Search Report related to the European Application No. EP21191865.1, dated Feb. 9, 2022.

* cited by examiner

AGRICULTURAL MACHINE WITH ADDITIONAL AXLE

CROSS-REFERENCE TO RELATED APPLICATION

This application claims the benefit of the filing date of U. K. Patent Application GB2018268.9, "An Agricultural Machine with an Additional Axle," filed Nov. 20, 2020, the entire disclosure of which is incorporated herein by reference.

FIELD

The present disclosure relates to agricultural machines and more particularly, to an additional axle attachment for an off-road agricultural machine.

BACKGROUND

When operating agricultural machines on public roads, operators must abide by vehicle weight restrictions imposed by state and federal governments. Vehicle weight restrictions are government-imposed to reduce damage to roadways caused by heavy vehicles and minimize fatal accidents. Most commonly, vehicle weight restrictions are measured in terms of load per axle and the overall spacing between axles. Thus, if the number of axles on the vehicle and the spacing thereof is increased, a given vehicle may carry more weight than would otherwise be permitted.

To satisfy vehicle weight restrictions, an agricultural vehicle can be made smaller to decrease the weight per axle of the vehicle. This is not always an adequate solution, because small agricultural vehicles fail to meet some needs of farmers operating the vehicles in the field. Another option is to add a further permanent axle to the agricultural vehicle, which would distribute the weight of the vehicle to more axles and would in turn decrease the weight per axle of the vehicle. However, such an axle may impede the operation of the vehicle in the field.

European patent EP 3 162 178 B1, "Vehicle Counterweight," granted May 3, 2017, discloses a tractor with a front and a rear axle. The tractor has a counterweight mounted on a front linkage of the tractor, which is used to balance the tractor in the field. If the tractor is traveling on the road, the counterweight is not required to assist with weight distribution, and can cause the tractor to be unstable due to the large weight borne by the suspended front axle. To avert this problem, at least one wheel is attached to the counterweight, which wheel can be switched between a non-working and a working position with a hydraulic cylinder to alter a load carried by the other axles. One problem of this arrangement is that the additional wheel is a unitary construction with the counterweight: if no counterweight is used, or another weight is needed, the additional wheel cannot be transferred easily. Furthermore, no other implement can be attached to the linkage system while the agricultural machine is equipped with the additional wheel.

U.S. Pat. No. 7,931,285, "Tag Axle Attachment for an Off Road Agricultural Applicator Vehicle," granted Apr. 26, 2011, discloses a tag axle for an agricultural vehicle. The tag axle carries at least one wheel on a mounting bracket coupled to the chassis and to a swing arm. The whole axle assembly can be raised and lowered with a telescopic device. The vehicle has a front and a rear axle, and the tag axle is located centrally aligned behind the rear axle. A problem with this device is that the additional tag axle is a hindrance for attaching an implement to the rear of the vehicle.

German Patent Application DE 10 2015 115 641 A1, "Agricultural Vehicle," published Mar. 16, 2017, discloses an agricultural vehicle with two different driving modes: a field mode and a street mode. The vehicle has a front axle, a rear axle, and an additional supporting tag wheel assembly between those two axles. The supporting tag wheel assembly is pivotably connected with a carrying structure to the chassis of the vehicle in an area in front of the front axle, and a pivotable actuator for the support wheel assembly is connected to the chassis in an area behind the front axle.

Disadvantages of the vehicle of DE 10 2015 115 641 A1, and other currently known solutions, are that the support tag wheel assembly is complex, difficult to assemble, cannot be easily attached to vehicles in their existing configuration, and require high additional efforts or have impact on the overall design, which increases product costs. Furthermore, existing tractors already owned by customers cannot be equipped with such systems as major parts of the vehicle must be reworked completely.

BRIEF SUMMARY

In accordance with a first embodiment, an agricultural machine includes a chassis, a front axle, a rear axle, and a linkage system for hitching of an implement or an attachment. The linkage system has at least one lift arm with a fastening device and an elongated part extending away from the fastening device. The at least one lift arm is adjustable relative to the chassis. An additional axle is connected to the elongated part of the at least one lift arm. The elongated part includes a first (inner) part and a second (outer) part moveable in relation to the first part. A distal end of the first part, a proximal end of the second part, and the additional axle are connected to each other by at least one common connecting element.

Using the same connecting element for connecting the distal end of the first part, the proximal end of the second part, and the additional axle reduces the number of connecting elements for attaching the additional axle to the elongated part.

In an embodiment, the agricultural machine can be for example an off-road vehicle like a tractor, a combine, a harvester, a windrower, or any other known agricultural vehicle.

In an embodiment, the linkage system includes two of the lift arms arranged as lower lift arms of a three-point linkage, the additional axle being connected to the elongated part of each of the lower lift arms. The linkage system may also include a hydraulic system configured to adjust the height of the lower the lift arms. The fastening device can be, for example, a coupling hook to attach an implement or an attachment to the linkage system. The elongated part is adjustably connected to the agricultural machine.

In an embodiment, the additional axle is detachable so that an operator can remove or mount the additional axle to the agricultural machine depending on operational needs. The additional axle can be detached to reduce the total weight of the vehicle, or can be attached to the vehicle to distribute the weight of the agricultural machine to three axles instead of two axles only.

The additional axle is connectable to the elongated part of the at least one lift arm. Thus, the fastening device of the at least one lift arm is still usable for different implements when the additional axle is connected to the lift arm. In this way, the linkage arm can be used to attach the additional axle and another implement, for example a mower, simultaneously. It is also possible to exchange the implement connected to the fastening device without detaching the additional axle. For example, the implement can be a front weight and depending on whether the additional axle is connected to the elongated part or not, a front weight with more or less weight can be attached to the fastening device correspondingly. In one embodiment, the additional axle can also be detached without detaching an implement from the fastening device.

The distal end of the first part is further away from a middle point of the agricultural machine than the proximal end. The proximal end of the first part is adjustably connected to the chassis of the agricultural machine. The fastening device is mounted to the distal end of the second part. If the linkage system is a three-point linkage system having two lower lift arms, the inner first parts of the lift arms may be formed as part of a unitary structure. Alternatively, the first parts of the lower lift arms may be defined by separate components.

In an embodiment, each of the distal end of the first part, the proximal end of the second part and the additional axle defines a respective bore, the respective bores being arranged, or configured to be arranged, concentrically (i.e., coaxially) to one another. Thus, the common connecting element can be inserted into the concentric bores to connect the first part, the second part, and the additional axle. The common connecting element may be a screw or a bolt or any other connecting means. The first and second part and the additional axle can define additional sets of bores for receiving at least one further common connecting element to enhance the stability of the mounting.

In an embodiment, the second part of the elongated part is pivotable about the at least one common connecting element so that the connecting element is used as a pivot joint. Thus, the fastening device mounted to the second part of the elongated part can be moved between a first position and a second position by pivoting the second part around the pivot joint in relation to the first part. Where the linkage system is a three-point linkage, this may apply to each of the lower lift arms.

Where the linkage system is a three-point linkage, the hydraulic system can be, for example, a hydraulic system as described in the U.S. Pat. No. 10,760,594, "Hydraulic Cylinder Supply System," granted Sep. 1, 2020.

In an embodiment, the at least one common connecting element holds the second part in one of two positions. For example, the distal end of the first part, the proximal end of the second part, and the additional axle have two sets of concentrically arranged bores, each set having a common connecting element inserted therein. While one of the two connecting elements is used as a pivot joint, the other connecting element prevents the pivotal movement. If the additional axle is not attached and if the other connecting element is removed from its set of concentric bores, the second part can be pivoted about the connecting element still inserted from one position to the other position. Thereafter, the second part can be secured again against an unintended switching of the position by inserting the other connecting element into the free set of bores.

Thus, in the above embodiment, the linkage system can be used in different modes—at least one operation mode and a parking mode. The at least one operation mode is occurs when the second part is in one position, and the parking mode occurs when the second part is in the other position.

In an embodiment, the linkage system, especially the second part of the elongated part, is operable in two operation modes—a first operation mode for compensation of external forces acting on the second part and a second operation mode disabling the compensation of external forces. Each mode is selectable by the at least one common connecting element. The first operation mode will be further also referred to as a floating mode. Thus, it is possible that all three modes, (i.e., the first and second operation modes and the parking mode) are selectable by the same common connecting element. Alternatively, the selection between the first and second operation modes may be made using a first common connecting element, and the selection between the at least one operation mode and the parking mode may be made using a second common connecting element.

Analogously to the usage of the common connecting element to switch between the at least one operation mode and the parking mode, a common connecting element can be used as a selector to select between the first and second operation modes. The bores and the connection elements are used to fix the linkage system in the different modes. As explained above, in order to switch the linkage system between the at least one operation mode and the parking mode, a connection element inserted into one set of coaxially aligned bores is removed. After that, the second part is moved, and the connection element may be put into different set newly aligned bores, and the linkage system is secured in the new mode. Which mode is used depends on which sets of bores are aligned and used to fix the two parts of the elongated part.

In an embodiment, the second operation mode (non-floating mode) is active when the distal end of the first part, the proximal end of the second part, and the additional axle are connected to each other by at least two common connecting elements. The first operation mode (floating mode) is active when the distal end of the first part, the proximal end of the second part, and the additional axle are connected to each other using only one common connecting element. The other common connecting element can be inserted into a set of bores in the additional axle and the first part, without passing through the proximal end of the second part.

In an embodiment, the distal end of the first part, the proximal end of the second part, and the additional axle have three sets of bores for receiving at least two common connecting elements: an upper concentric bore set, a lower concentric bore set, and an outer (forward) concentric bore set. To place the linkage system in a floating mode, two connecting elements are used—one in the upper bore set and one in the lower concentric bore set. The lower concentric bore set may include aligned bores in the additional axle and the first part only. If the linkage system is in an operation mode so the implement should be kept at a constant depth and floating is disabled, then the upper and the outer concentric bore sets are used. In the parking mode, the upper concentric bore set and either the outer or the lower concentric bore set are used.

In an embodiment, the second part of the at least one lift arm is orientated in a horizontal manner in a first position when the linkage system in an operation mode and allows the attachment of implements or attachments to the fastening device. Such attachments or implements can be for example a counterweight, a trailer, a ground-working device like a harrow, a mower, a plough, etc. In an embodiment, when in a parking mode (also called parking position), the second part of the elongated part of the at least one lift arm is orientated in a vertical manner in a second position. The at least one lift arm can be switched into a parking position when no implement or attachment is connected to the agricultural machine using the linkage system, so the overall length of the agricultural machine is reduced.

The floating mode can be used when the second part of the elongated part and the fastening device are either in a horizontal or a vertical orientated position. The floating mode is used to achieve a bigger vertical degree of freedom by allowing the lift arms to swing freely. The floating mode is provided to enable movement of the lift arms in vertical direction to avoid mechanical damage when, for example, the implement is moved upwards by external forces. This may occur when an implement such as a front packer runs on a stone in the field. This vertical degree of freedom can either be achieved mechanically or hydraulically.

It should be clear, that the disclosure is not limited to the operation modes described above, and that additional or other modes can be implemented. Further, the disclosure is also not restricted to the two positions the second part can be switched between, but additional positions can be defined. For each mode or position a separate set of bores through the first and second part of the elongated part and the additional axle can be defined.

In an embodiment, the additional axle is not detachable, at least not easily, to comply with road regulations.

As described above, the floating mode is enabled when a connecting element is inserted into the upper bore set and another into the lower bore set. If the floating mode should be disabled, then an additional connecting element can be inserted into the third bore set so all three bore sets are used to connect the additional axle to the linkage system. However, this system is not limited to use of three bore sets.

In an embodiment, at least one common connecting element is removable and is secured in position by a safety device configured to require use of a tool to enable removal of the at least one common connecting element. In an embodiment comprising three sets of concentric bores, two common connecting elements which are not used to select the floating mode can be secured with first safety devices which cannot be removed easily without special equipment. These first safety devices might be, for example nuts, which are secured with safety lines or pins. In this embodiment, a third common connecting element, which is used to select the floating mode, can be secured with a second safety device that does not require the use of a tool to be released. This second safety device might be a safety pin, so the floating mode can be activated or deactivated in easily and quickly.

In an embodiment, the additional axle can be detached when the linkage system is moved into the parking mode. For example, if the agricultural machine is to be used in transportation (e.g., with drawbar trailers) and the maximum load of the front and rear axles is not exceeded, then the additional axle could be removed and the linkage system brought into the parking mode.

In an embodiment, the additional axle fixedly connected to the linkage system and is not removable. In some embodiments, the additional axle is connected to the linkage system such that a removal of the additional axle is not possible without the destruction of some components, for example by welding.

The additional axle carries at least one wheel, but in an embodiment at least two wheels, which are spaced apart from each other.

In an embodiment, the additional axle can be switched between a travel position for bringing the at least one wheel in contact with the ground and a stored position for lifting the at least one wheel from the ground. The travel position is typically used when the agricultural machine travels on a road. The stored position is typically used when the agricultural machine travels off-road, for example if the machine is working on a field.

In an embodiment, at least a first suspension cylinder can be used to switch the position of the additional axle, for example to lift the wheels of the additional axle off the ground from a travel position to a stored position.

In an embodiment, a second suspension cylinder is oriented in a crosswise direction to the first suspension cylinder. That is, the longitudinal axes of the first and second suspension cylinders are arranged at an angle relative to one another and the arrangement configured such that their longitudinal axes cross at a position between longitudinal ends of the cylinders. These two crosswise oriented suspension cylinders can be used to lift the wheels of the additional axle from a travel position to a stored position. The agricultural machine may have a power-take-off shaft (PTO) and the two suspension cylinders may be located in a crossed arrangement configured such that access to the PTO shaft is between the cylinders (e.g., between top ends of the cylinders).

The stored position is typically used when the agricultural machine does not exceed the axle weight regulations for the front and rear axles and/or is operating off-road. The travel position is optionally used when the agricultural machine travels on a road and use of the additional axle is required to meet road regulations relating to maximum vehicle weight per axle. Then, the additional axle can be switched into the travel position, so the wheel or wheels of the additional axle contact the ground and are able to take over some of the vehicle load.

In an embodiment, the additional axle has at least three portions: a middle portion and two side portions. The two side portions carry the wheels of the axle, while the middle portion connects the two sides.

In an embodiment, the two side portions of the additional axle include components that are substantially identical.

In an embodiment, only the middle portion differs between the various agricultural machines.

In an embodiment, the wheels of the additional axle are located on the same line as the wheels of the other axles.

To achieve a bigger free space for the wheels of the agricultural machine, the wheels of the additional axle may be inclinable relative to the longitudinal central axis of the agricultural machine. The additional axle can be arranged so that a collision between a wheel of the additional axle and another wheel connected to the front axle or the rear axle of the agricultural machine is avoided.

The longitudinal central axis extends along the driving direction of the agricultural machine if the agricultural machine is driving directly forward. In an embodiment, the wheels are moved into an inclined position when the additional axle is moved into a stored position. This may be achieved by using a Bowden cable or wire, which is connected with a wheel carrier near the wheels of the additional axle. However, other methods to achieve an inclination of the wheels or the whole axle can also be used. In an embodiment, each wheel is inclined by a respective Bowden cable.

In an embodiment, the Bowden cable can either be actuated with a separate drive device or it can be used without one by using the relative movement of the existing components, for example of the lower wishbones and the middle portion.

In an embodiment, the additional axle can be a double wishbone-portal axle, so that when the additional axle is switched into the stored position, the wheels of the double wishbone-portal axle are lifted from the ground by the suspension cylinders.

In an embodiment, each side portion of the additional axle has at least two arms, an upper arm and a lower arm. In this embodiment, the lower arm has two ends and is pivotably connected at one end either to the middle portion or the attachment portion, and at the other end the lower arm is pivotably connected to the upper arm. The upper arm may have a first and a second arm part. The first arm part and the second arm part may be connected to each other at a pivoting point of the upper arm. In this embodiment, the pivoting point of the upper arm is used to pivot the first and the second arm part in relation to each other when the additional axle is switched from the travel position to the stored position.

In one embodiment, the first arm part includes a hinge, so the arm parts can pivot around the attachment portion of the additional axle. The attachment portion is used to attach the additional axle to the linkage system. In an embodiment, each side portion has an attachment portion. The attachment portion has two sides, which are located on different sides of the lift arm at the connection area. The attachment portions interact with the connection elements to fix the additional axle to the linkage system. The first arm part of the upper arm also has a lever point, to which one end of the suspension cylinder is connected. The other end of the suspension cylinder, which is connected to the middle portion of the additional axle, may be immovable. When the suspension cylinder expands or contracts, the lever point is pushed away from the middle portion or is pulled to it. Through this motion, the arms and therefore also the wheels of the additional axle are either lifted away from the ground or lowered towards the ground. In this embodiment, the upper arm consists of two parts and the lower arm of one part, but it is also possible that both arms include one or more parts.

The additional axle can be designed, for example, as a tag axle or as a steering axle. A centering-spring can be used to orientate the steering knuckles of the additional axle into a forward position.

In an embodiment, the wheels of the additional axle can be slowed down with one or more brakes. The additional axle may have at least one brake. The brake can be, for example, a mechanical brake. In an embodiment, the brake is drum brake is located in the wheel hub, but other types of brakes are possible. The brake is in an embodiment actuated pneumatically or with a brake cylinder, which is connected to the braking system of the agricultural machine.

The additional axle can be located either at the front or the rear of the agricultural machine.

In an embodiment, the additional axle is located at least one meter away from the next axle of the agricultural machine.

According to another embodiment, an agricultural machine has a chassis, a front axle, a rear axle, and a three-point linkage system for hitching of an implement or an attachment. The linkage system has a pair of lower lift arms, each lower lift arm having an inner end movably mounted to the chassis and an outer end carrying a fastening device. An additional axle carrying a pair of wheels for engagement with the ground is mounted to and between the lower lift arms inboard of the fastening devices.

In an embodiment, each lower lift arm has an inner part and an outer part moveable in relation to the inner part. For each lower lift arm, a distal end of the inner part, a proximal end of the outer part, and the additional axle are connected to each other by at least one common connecting element.

In an embodiment, the additional axle is switchable between a stored configuration in which the wheels are positioned to be clear of the ground and a travel configuration in which the wheels are positioned for contact with the ground.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
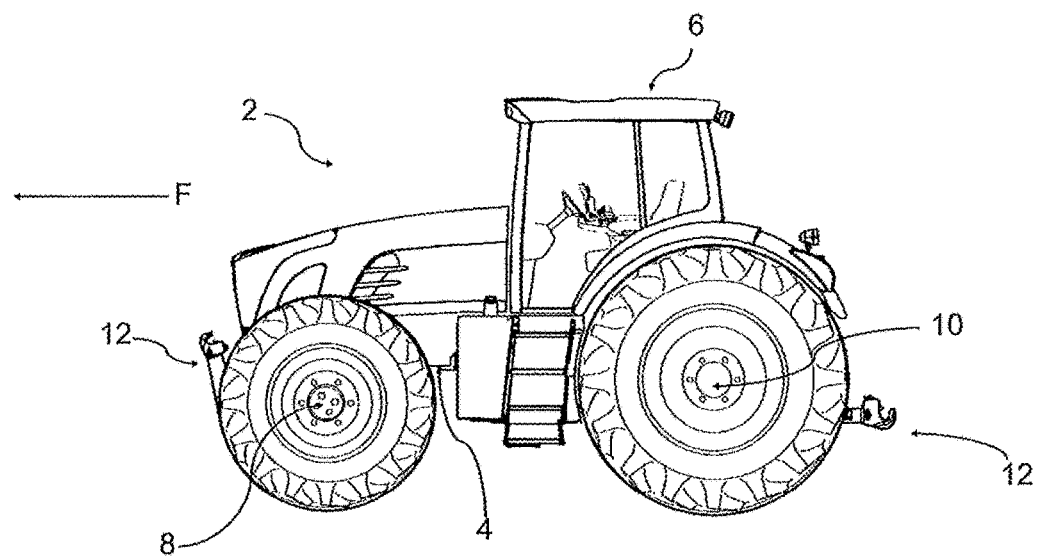
FIG. 1 is a simplified side view of an agricultural machine.

The illustrations presented herein are not actual views of any particular tractor or other vehicle, or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "about" used in reference to a given parameter is inclusive of the stated value and has the meaning dictated by the context (e.g., it includes the degree of error associated with measurement of the given parameter).

FIG. 1 is a simplified side view of an agricultural machine, in the form of a tractor 2. The tractor 2 has a chassis 4, a cab 6, a front axle 8, a rear axle 10, and a linkage system 12. The linkage system 12 is typically a three-point linkage system and can be attached to the front and/or the rear of the tractor 2.

According to some government regulations, the maximum total vehicle load may be limited to about 9 tons per axle. Thus, for a two-axle vehicle, a maximum overall vehicle load would be 18 tons. For tractors having three axles, the maximum overall vehicle load may accordingly be 27 tons. Because the vehicle load is not only resulting from the vehicle weight but also depends on attachments (e.g., front rear and wheel weights) or implement weight fully acting on the linkage system 12, the vehicle load limit can be exceeded under certain conditions. This may be particularly common with the increased sizes of machines and implements. Thus, an additional axle 30 (FIG. 3) may be fixedly added to the agricultural machine 2 to increase the legal maximum overall vehicle load.

Figure 2:
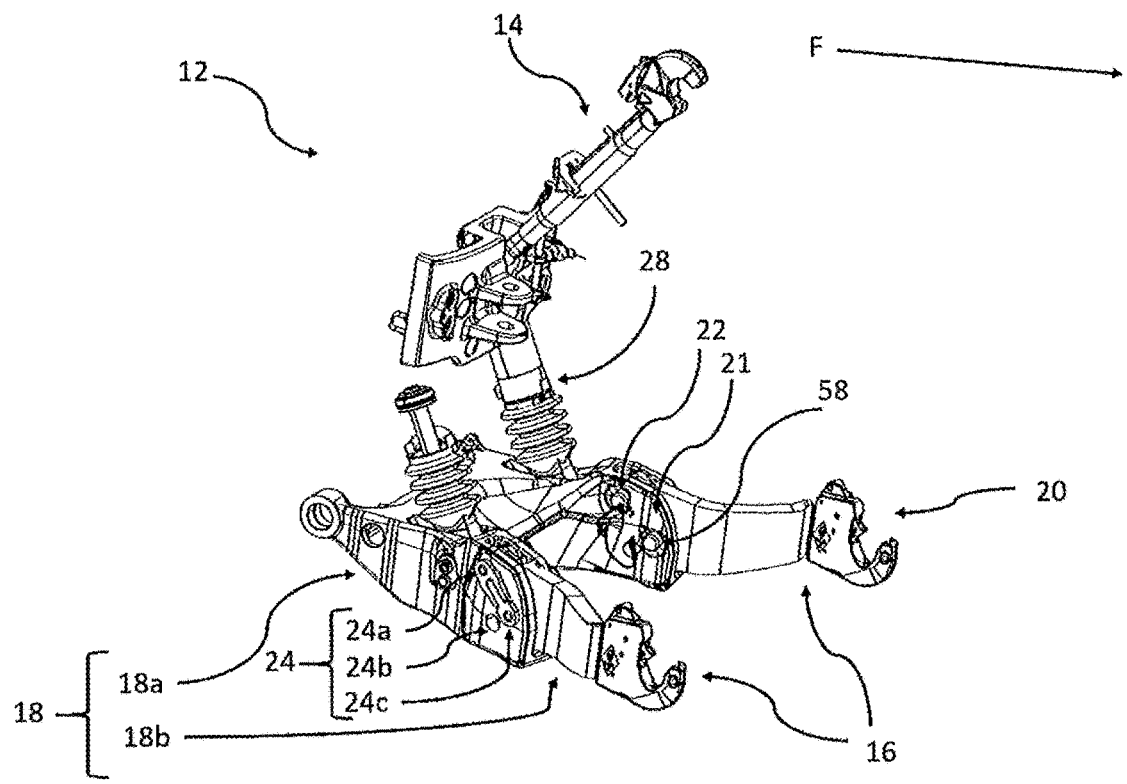
FIG. 2 is a simplified perspective view of a linkage system of the agricultural machine in a working mode.

FIG. 2 is a simplified perspective view of a linkage system 12, which in this embodiment is located at the front of the tractor. However, the disclosure can be adapted for use with a linkage systems at the rear of a tractor or other agricultural machine.

In this embodiment, the linkage system 12 is a three-point linkage. The linkage system 12 has an upper lift arm 14 and two lower lift arms 16. Each lower lift arm 16 includes a fastening device 20 in the form of a hook at an outer (distal) end of an elongated part 18. The elongated part 18 has two parts—a first (inner) part 18a, which is pivotably connected to a pivot point provided by the chassis 4 of the vehicle to be moved by lifting cylinders forming part of a hydraulic system 28 (in a manner known in the art), and second (forward) part 18b, to which the fastening device 20 is fixed, e.g., by welds. In the shown embodiment, the first parts 18a of the two lower lift arms are formed together as part of a unitary component 18 pivotably connected to the chassis 4 of the tractor 2 and which can be moved by the lifting cylinders. This unitary component 18 has a pair of arms (left and right) which each define the first, inner part 18a of one of the lower lift arms 16. However, in alternative embodiments, the first inner parts 18a of the lower lift arms may be separate or separable components.

In the embodiment as shown, the first part 18a of each lower lift arm 16 includes elements for connecting the second part 18b at a connection area 21. The first part 18a and the second part 18b may each have three bores 24 (i.e., 24a, 24b, 24c) at the connection area 21, which are used to connect the two parts 18a, 18b together using common connecting elements 22, 26, 58. These connecting elements 22, 26, 58 can be, for example, conventional connecting elements like screws, bolts, etc. One bore 24a in combination with a connecting element 22 creates a pivot point so the second part 18b can be pivoted around this pivot point in relation to the first part 18a. The hydraulic system 28 may include two hydraulic cylinders attached to the linkage system 12. The hydraulic system 28 is used to lift and lower the first parts 18a so that the second parts 18b and the fastening devices 20 are also lifted or lowered. The hydraulic system 28 also provides other known modes of operation which are well known and therefore not described herein.

The lower links 16 can be moved from an operational configuration to a parking configuration by pivoting the second outer parts 18b relative to the first parts 18a about the connection element 22. In the parking configuration, the second parts 18b extend generally upwardly; in the operating configuration, the second parts 18b extend generally horizontally in-line with the first part 18a. In FIG. 1, the linkage system 12 at the front of the tractor 2 is shown in the parking configuration with the outer parts 18b extending upward, and the linkage system 12 at the rear is shown in the operating configuration with the second parts 18b extending outward. The operating configuration is used when an implement is attached to the linkage system. The parking configuration can be used when no implement is attached, shortening the length of the tractor 2. The second part 18b of the lower lift arms 16 may rotate through an angle of about 80° between the operational and parking configurations.

When the linkage system 12 is in the operational configuration, it can be switched between different operation modes—a first operation mode (also referred to as floating mode) and a second operation mode (also referred to as non-floating mode). A floating mode is also possible when the linkage system 12 is in a parking configuration. However, when an implement is attached, then the linkage system can only be switched between the first and second operation modes.

In the non-floating mode, the first part 18a and the second part 18b of the lower lift arms 16 are rigidly connected as shown in FIG. 2. In the floating mode, the second parts 18b can pivot about the pivot point 22 relative to the first part 18a, at least to a limited extent. Compared to the non-floating mode, the floating mode enables an additional degree of freedom, because the second parts 18b and the attachment or implement attached to the fastening device 20 can move up and down when an external force (e.g., applied by a stone in the field) is applied to avoid damaging the linkage system 12. The non-floating mode and the floating mode are used when an attachment or an implement is connected via the fastening device 20 to the linkage system 12, so the tractor 2 can fulfill tasks in the field.

The parking configuration mode may be used to reduce the overall length of the vehicle when no implement or attachment is connected to the linkage system 12, typically when the tractor 2 is traveling on a road. The linkage system 12 is switched from an operational configuration to the parking configuration by moving the second part 18b (e.g., manually) from a first position into a second position.

The distal end 72 (FIG. 8) of the first part 18a, the proximal end 74 of the second part 18b, and the additional axle 30 each have three bores 24a, 24b, 24c. The bores in the first part 18a, the proximal end 74 of the second part 18b, and the additional axle 30 are arranged in corresponding sets that align concentrically (i.e., coaxially) so that a common connecting element 22, 26, 58 can be inserted into the aligned bores of each set to connect the parts and the axle together. Thus, a first common connecting element 22 is inserted into the bores 24a of a first set, a second common connecting element 26 inserted into the bores 24b of a second set, and a third common connecting element 58 inserted into the bores 24c of a third set. In use, only two common connecting elements may be required, these being the first common connecting element 22 and one of the second and third common connecting elements 26, 58. In this case, the second and third common connecting elements 26, 58 can be the same connecting element, and the connecting element 26, 58 is inserted either in the set of bores 24b or in the set of bores 24c to select one of the operation modes.

If the linkage system 12 is in the first operation mode (floating mode) then the connecting elements 22 and 26 are inserted into the bores 24a and 24b. If the linkage system 12 is in the second operation mode (non-floating mode), then the connecting elements 22 and 58 are inserted into the bores 24a and 24c.

To switch the linkage system 12 into a parking mode, the connecting element 26, 58 inserted either in the bore 24b or 24c is removed. Then, the second part 18b is pivoted around the pivot point 22 and then fixed again by inserting the connecting element 26/58 back into the bore 24b or 24c. Analogously, the linkage system 12 can be switched back to one of the operation modes by reversing the above steps.

Figure 3:
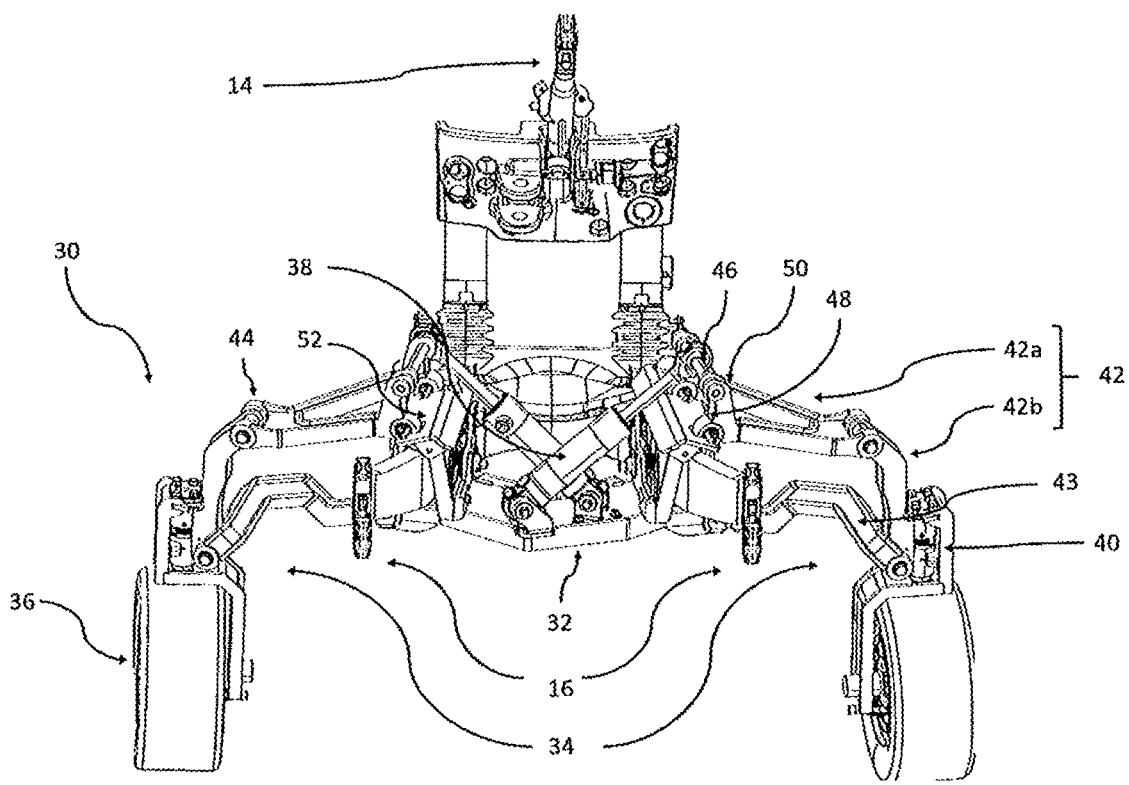
FIG. 3 shows a front view of the linkage system of FIG. 2 with an attached additional axle in a travel position.

FIG. 3 is a simplified front view of the linkage system 12 with an attached additional axle 30 in a travel position. In this embodiment, the additional axle 30 has at least three portions—a middle portion 32 and two side portions 34. Most components of the side portions 34 are construction-wise identical except for the lower axle arm 43. The lower axle arm 43 is mirror symmetrical. The side portions 34 are identical for the different agricultural machines, to which the additional axle 30 is attached. The middle portion 32, which connects the side portions 34, can change between the different agricultural machines, so there are different middle portions 32 for the different machines, but the same components for the side portions 34 are used. Each side portion has a wheel 36, so the additional axle 30 has at least two wheels 36 with a certain distance between them.

The additional axle 30 has first and second suspension cylinders 38 arranged in a crosswise manner. Both cylinders 38 are used to lift the wheels 36 off the ground to bring the additional axle 30 into a stored position. The suspension cylinders 38 can also lower the wheels 36 back to the ground to bring the additional axle 30 into a travel position. The travel position may be used when the tractor 2 is traveling on the road to redistribute weight on the different axles. The two suspension cylinders 38 are designed to be mounted in a crossed fashion so the power-take-off shaft of the tractor 2 is not blocked. The free access to the power-take-off shaft is achieved by locating the one end of the suspension cylinder 38, which is attached to the middle portion 32 of the additional axle 30, at a position which is located on the other side of the longitudinal central axis of the tractor 2. This longitudinal central axis is represented by the driving direction F when the tractor 2 is moving directly forward, which is shown in FIGS. 1 and 2.

FIG. 3 illustrates that the wheels 36 of the side portions 34 are designed as tag wheels. The additional axle 30 is designed in this embodiment as a double wishbone-portal axle. Each side portion 34 has a lower arm 43 and an upper arm 42, which carry a Bowden cable 40, a wheel carrier 66, a wheel hub 68, and the wheel 36. The upper arm 42 has a first arm part 42a and a second arm part 42b, which are connected to each other at a pivoting point of the upper arm 44. Each side portion 34 also includes an attachment portion 52 with a first side 54 and a second side 56, which is used to connect the additional axle 30 to the linkage system 12. The first side 54 of a side portion 34 is located on the outer side of the lower lift arms 16 at the connection area 21, and the second side 56 is located on the inner side of the lower lift arms 16. The first arm part 42a is pivotably connected to the attachment portion 52 with a hinge 48. The first arm part 42a also has a lever point 46, which is connected to one end of a suspension cylinder 38 so the upper arm 42, the lower arm 43, and therefor also the wheel 36 can be lifted from the ground into a stored position once the suspension cylinder 38 contracts. The first arm part 42a can have a V-like form, so the first arm part 42a is connected with two hinges 48 to the attachment portion 52. The lever point 46 can be a bolt, which extends between the protrusions 50 of the both ends of the V-like first arm part 42a. One end of the suspension cylinder 38 is connected to this bolt of the lever point 46 between the two protrusions 50.

Figure 4:
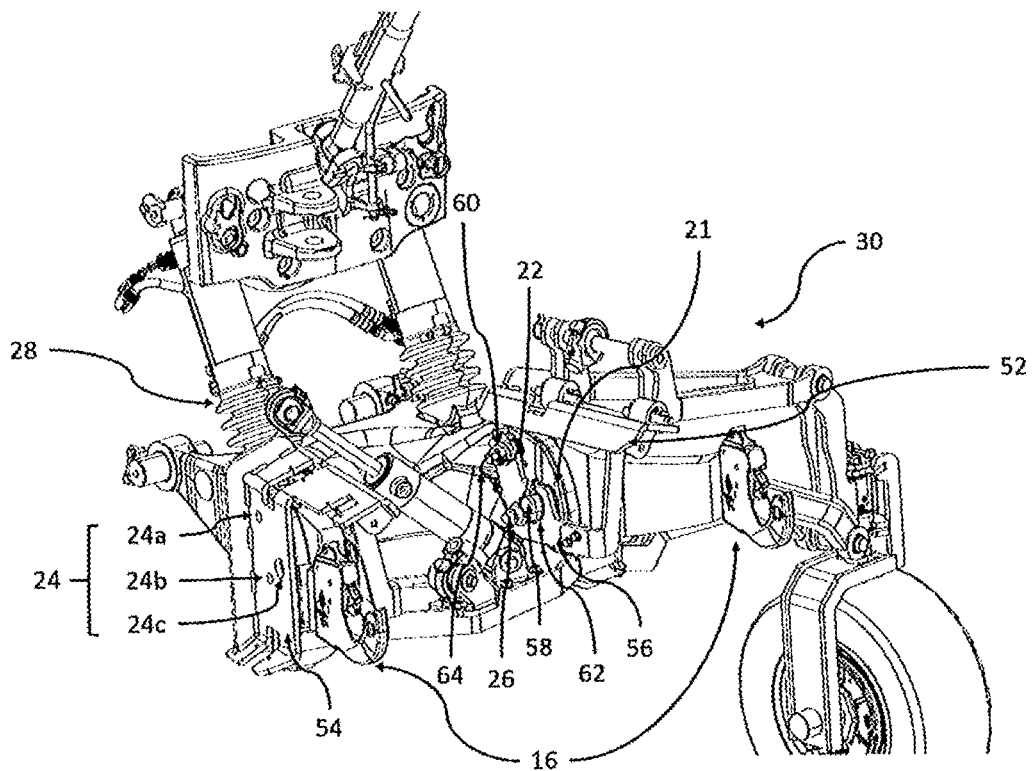
FIG. 4 shows a partly more sideways orientated view of the linkage system of FIGS. 2 and 3 with the attached additional axle in the travel position.

FIG. 4 shows a partly more sideways orientated view of the linkage system 12 with the attached additional axle 30 in the travel position. The additional axle 30 uses the same bores 24 of the lower lift arms 16 to be attached to the connection area 21.

The same connecting elements 22, 26, 58 are also used to attach the additional axle 30 to the linkage system 12. The connecting elements 22, 26, 58 may be designed so that the additional axle 30 is not easily detachable. This means that the additional axle 30 cannot be removed on the fly by hand in a matter of minutes. Extra tools are needed to release the connection means so the additional axle 30 can be detached from the linkage system 12. The connecting elements 22, 26, 58 in this embodiment are bolts, which are plugged into the bore 24 of the elongated part 18 and extend through the corresponding bores 24 in the first and second sides 54, 56 of the attachment portion 52 of the additional axle 30. The two connecting elements 22, 26, which are plugged into the first and second sets of bores 24a and 24b from outside of the linkage system 12 towards the longitudinal central axis of the tractor 2, extend through the first side 54 of the attachment portion 52, the elongated part 18, and through the second side 56 of the attachment portion 52, and are secured by safety devices 60. In this case, the safety devices 60 are nuts, which can further be secured with a safety line 64. The connection element 58 is inserted through the third set of bores 24c is also a bolt. However, in this case the connection element can be secured with a safety pin 62, which can be removed without tools. This enables the linkage system to be switched between non-floating and floating modes relatively quickly.

Alternatively the floating mode can also be achieved hydraulically by letting the hydraulic system 28 regulate itself, so each external force is compensated by the fluid inside of the hydraulic cylinders. So the linkage system 12 with the attached additional axle 30 can be easily switched between a non-floating mode and a floating mode, but it cannot easily be switched between the parking mode and one of the first or second operation mode.

FIG. 4 also shows the attachment portion 52, which interacts with the connecting elements 22, 26, and 58 to connect the additional axle 30 to the lower lift arms 16 of the linkage system 12. Each connecting element 22, 26, 58 has to be released if the additional axle 30 should be detached from the linkage system 12. However, it is also possible to use screws or other connecting elements instead of bolts as connecting elements 22, 26, 58.

Figure 5:
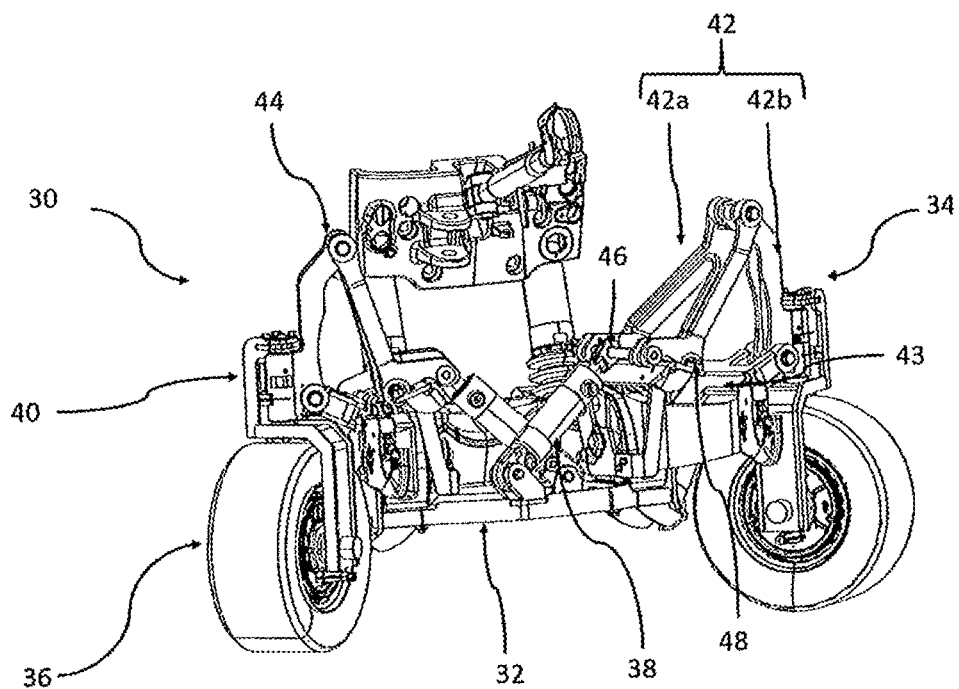
FIG. 5 shows the a portion of the linkage system of FIGS. 2 and 3 with the attached additional axle in a stored position.

FIG. 5 shows the linkage system 12 with the attached additional axle 30 in a stored position. The stored position is used when the tractor 2 is operated off-road or when the additional axle is not required for road use. To achieve a bigger free space for the wheels of the tractor 2, the wheels 36 of the additional axle 30 are also inclined in relation to the longitudinal central axis of the tractor 2 by using the Bowden cable 40. In this embodiment, the wheels 36 are inclined around 45 degrees. So if the additional axle 30 is switched into the stored position, the suspension cylinder 38 contracts and pulls the lever point 48 towards the middle portion 32, which leads to lifting of the upper and lower arms 42, 43 and therefore also of the wheels 36. The Bowden cable 40 is also actuated and the wheel carriers 66 are swung about a vertical axis so that the wheels are angled relative to the longitudinal central axis of the tractor to achieve a bigger free space for the wheels of the tractor 2.

Figure 6:
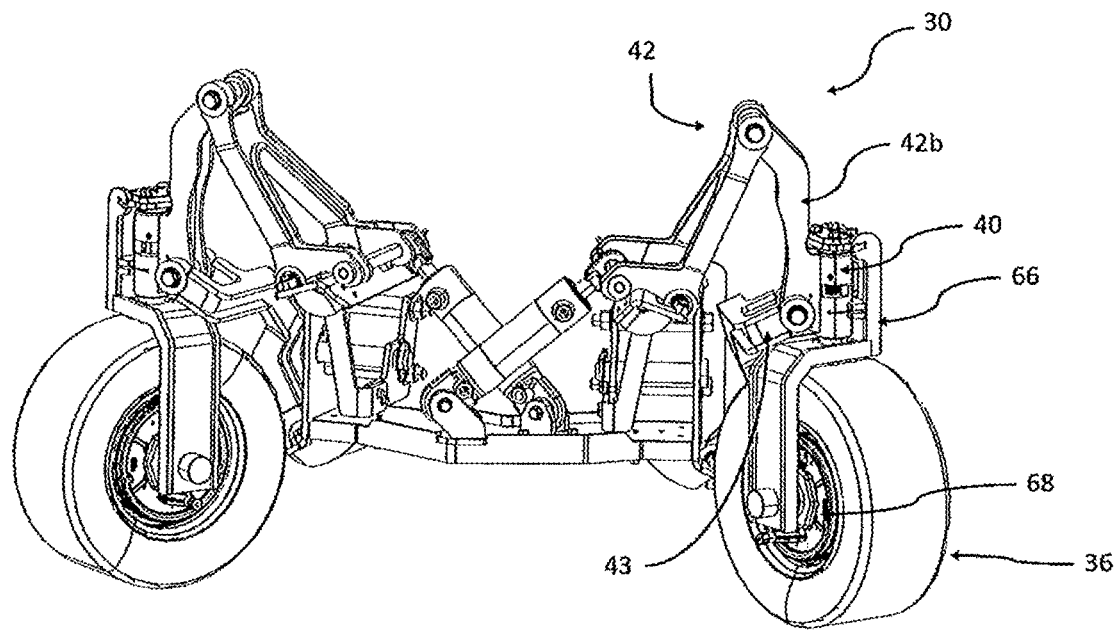
FIG. 6 shows a frontal view of the additional axle of FIG. 3 in a stored position without the linkage system.

FIG. 6 shows a frontal view of the additional axle 30 in a stored position without the linkage system 12. FIG. 6 also shows that the lower axle arm 43 is pivotably connected to one end of the second arm part 42b of the upper axle arm 42, so they can pivot in relation to each other. The wheel carrier 66 is pivotally connected to the second arm 42b by a vertically aligned pivot pin so the wheel 36 can be angled to the longitudinal central axis of the tractor 2 by pivoting the wheel carrier 66 around a vertical axis of the pivot pin. The Bowden cable 40 is configured to pivot the wheel carrier 66 when the additional axle is placed in the stored position. This may be arranged to happen automatically as the wheels are raised. The wheel carrier 66 may be biased by a spring to return to the straight-ahead position when the wheels are lowered for contact with the ground. The wheel carrier 66 has a wheel hub 68 mounted to it, which carries the wheel 36.

Figure 7:
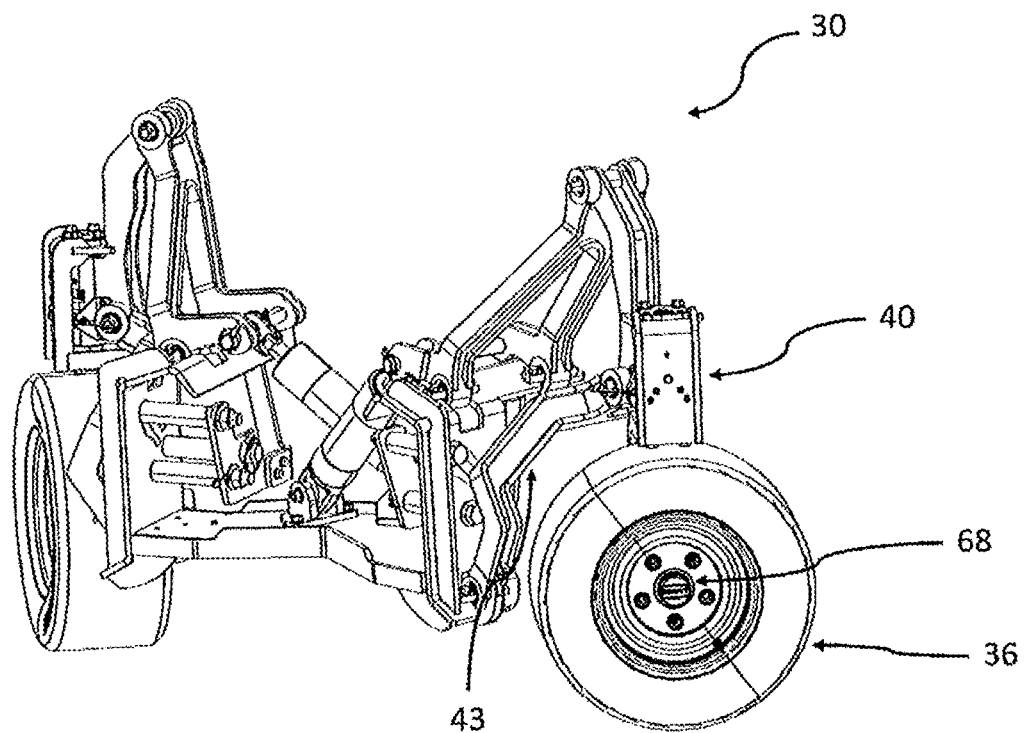
FIG. 7 shows the additional axle of FIG. 3 in a stored position from the rear in a more sideways manner.

FIG. 7 shows that the lower axle arm 43 of the additional axle 30 can be angled to fit the form of the wheel 36 so the lower axle arm 43 is not in the way when the wheel assembly, consisting of the wheel carrier 66, the wheel hub 68, and the wheel 36, gets inclined by the Bowden cable 40. However, it is also possible in another embodiment to design the lower axle arm 43 in a non-inclined way.

Figure 8:
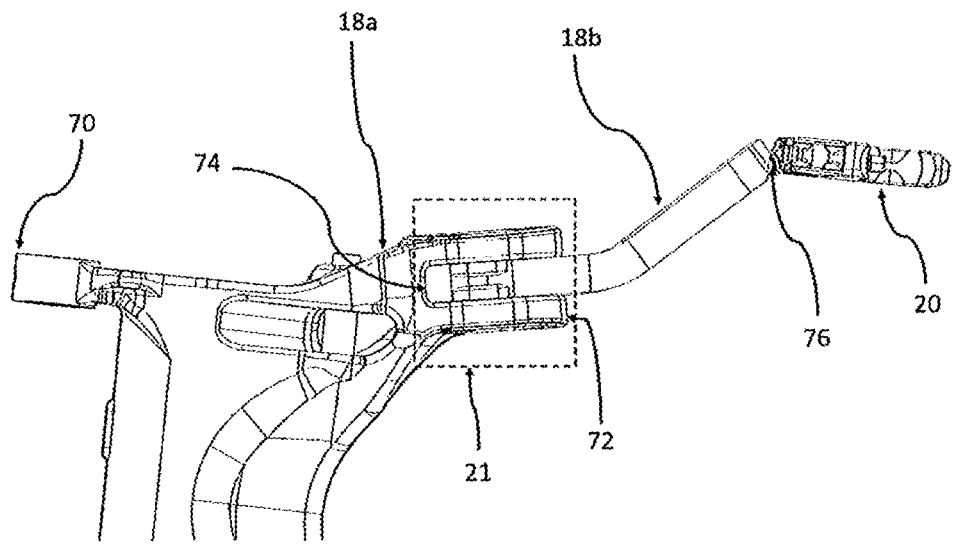
FIG. 8 shows a top view of the connection area of the linkage system of FIGS. 2 and 3 with the additional axle.

FIG. 8 shows a top view of the connection area 21 with the first part 18a, the second part 18b, and the fastening device 20. The first part 18a has a proximal end 70 adjustably connected to the chassis 4 (see FIG. 1; omitted from FIG. 8), and a distal end 72. The distal end 72 of the first part 18a splits into two protrusions or lugs so a proximal end 74 of the second part 18b can be inserted into the gap between the two protrusions. The second part 18b also has a distal end 76 to which the fastening device 20 is mounted. The distal end 72 of the first part 18a and the proximal end 74 of the second part 18b are pivotably connected to each other in the connection area 21, which connection area includes the whole contact area between the distal end 72 of the first part 18a and the proximal end 74 of the second part 18b.

Figure 9:
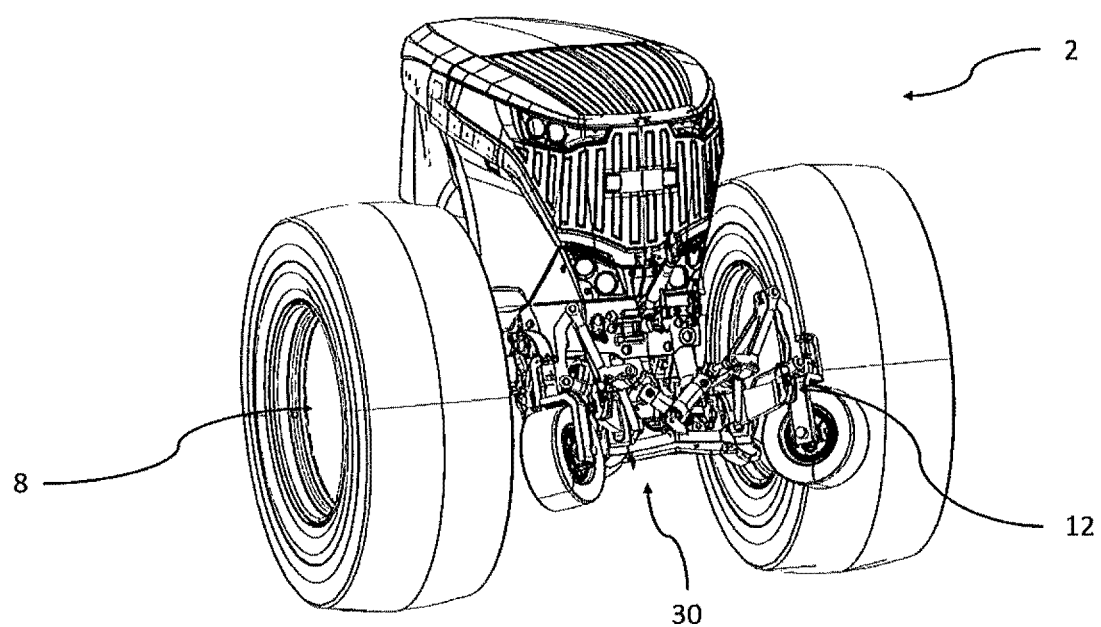
FIG. 9 shows the additional axle of FIG. 3 in a stored position in relation to a tractor.

FIG. 9 shows a forward part of a tractor 2 with the front axle 8, the linkage system 12, and an attached additional axle 30 in a stored position.

All references cited herein are incorporated herein in their entireties. If there is a conflict between definitions herein and in an incorporated reference, the definition herein shall control.

The disclosure is not limited to an additional axle attached to tractors only, but is applicable to all additional axles used on a variety of agricultural vehicles and machinery as well as other utility vehicles and machinery. Many additions, deletions, and modifications to the illustrated embodiments may be made without departing from the scope of the claims, including legal equivalents. In addition, features from one embodiment may be combined with features of another embodiment while still being encompassed within the scope as contemplated by the inventors. It is also to be understood that the components disclosed here can consist of one part or multiple parts. When two parts are connected fixedly to each other, this can mean that the two parts are for example welded together or connected in any known way or created via cast molding as one piece.

What is claimed is:

1. An agricultural machine comprising:
a chassis;
a front axle;
a rear axle;
a linkage system configured for hitching an implement or an attachment, wherein the linkage system comprises two lower lift arms arranged as lower lift arms of a three-point linkage, wherein the lower lift arms are adjustable relative to the chassis, each lower lift arm having a fastening device and an elongated part extending away from the fastening device, and wherein the elongated part comprises a first part and a second part pivotably moveable in relation to the first part; and
an additional axle carrying a pair of wheels for engagement with the ground, the additional axle connected to the elongated parts of the lower lift arms;
wherein for each lower lift arm, a distal end of the first part of the elongated part, a proximal end of the second part of the elongated part, and the additional axle are connected to each other by at least one common connecting element, the second part being pivotable about the at least one common connecting element relative to the first part.

2. The agricultural machine of claim 1, wherein the additional axle is movable between a stored configuration in which the at least one wheel is positioned to be clear of the ground and a travel configuration in which the at least one wheel is positioned for contact with the ground.

3. The agricultural machine of claim 2, further comprising a first suspension cylinder operable to move the additional axle between the stored configuration and the travel configuration.

4. The agricultural machine of claim 3, further comprising a second suspension cylinder operable together with the first suspension cylinder to move the additional axle between the stored configuration and the travel configuration, wherein the second suspension cylinder is oriented in crosswise direction relative to the first suspension cylinder.

5. The agricultural machine of claim 2, wherein the pair of wheels are inclinable in relation to a longitudinal central axis of the agricultural machine for avoiding a collision with another wheel connected to the front axle or the rear axle.

6. The agricultural machine of claim 5, wherein each wheel of the pair of wheels is mounted to a wheel carrier pivotably mounted to a structural part of the additional axle, wherein a Bowden cable is connected with the wheel carrier for inclining the position of each wheel of the pair of wheels of the additional axle.

7. The agricultural machine of claim 1, wherein the at least one common connecting element is configured to selectively hold the second part in either one of two positions.

8. The agricultural machine of claim 1, wherein the second part is operable in a floating operation mode for compensation of external forces acting on the second part and a non-floating operation mode disabling the compensation of external forces, wherein the operation mode is selectable by the at least one common connecting element.

9. The agricultural machine of claim 8, wherein the non-floating operation mode is active when the distal end of the first part, the proximal end of the second part, and the additional axle are connected to each other by at least two common connecting elements, and that the floating operation mode is active when the proximal end of the second part and the additional axle are connected to each other by only one common connecting element.

10. The agricultural machine of claim 1, wherein the distal end of the first part, the proximal end of the second part, and the additional axle each define at least one set of corresponding bores, wherein when the sets of corresponding bores are arranged coaxially with one another, the bores are configured to receive the at least one common connecting element therethrough.

11. The agricultural machine of claim 1, wherein the at least one common connecting element is removable and wherein the at least one common connecting element is securable by at least one safety device against a toolless removal.

12. The agricultural machine of claim 11, wherein the at least one common connecting element is configured to selectively hold the second part in either one of two positions, and wherein the at least one common connecting element is securable by at least one safety device against a toolless removal.

13. The agricultural machine of claim 1, wherein the additional axle is a double wishbone-portal axle.

* * * * *